E. BURGIN.

Electric Lamp.

No. 9,548. Reissued Feb. 1, 1881.

Witnesses
John Becker
Fred K. Haynes

Inventor:
Emil Burgin
by his Attorneys
Brown & Brown

N. PETERS, Photo-Lithographer, Washington, D. C.

UNITED STATES PATENT OFFICE.

EMIL BÜRGIN, OF BASLE, SWITZERLAND.

ELECTRIC LAMP.

SPECIFICATION forming part of Reissued Letters Patent No. 9,548, dated February 1, 1881.

Original No. 206,083, dated July 16, 1878. Application for reissue filed September 16, 1880.

*To all whom it may concern:*

Be it known that I, EMIL BÜRGIN, of Basle, in the Republic of Switzerland, have invented an Improvement in Electric Lamps; and I do hereby declare that the following is a full, clear, and exact description of the same, reference being had to the accompanying drawings, forming part of this specification.

My invention relates to that class of electric lamps in which light is produced by the combustion of carbons in the electric circuit.

The invention has for its object the automatic adjustment of the carbons to keep them at the proper distance apart for the production of light of a maximum intensity.

Figure 1:
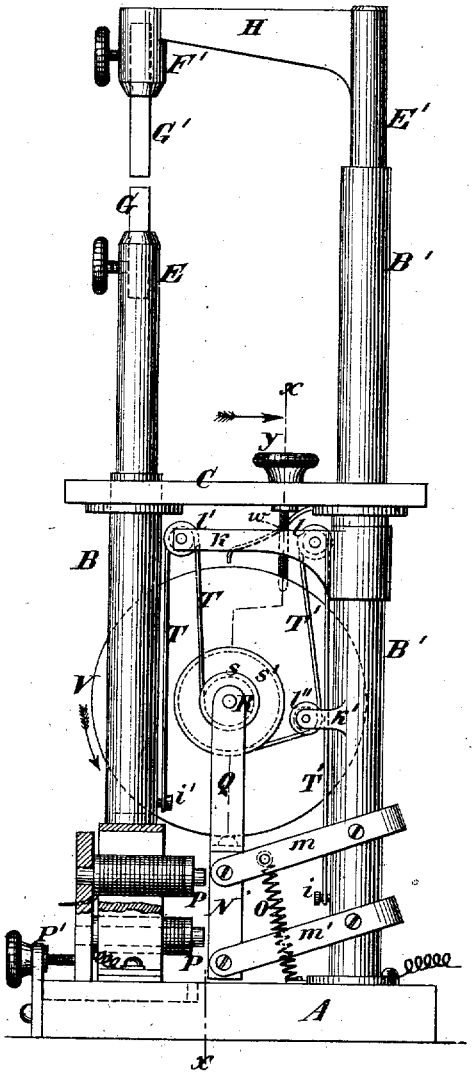
Figure 2:
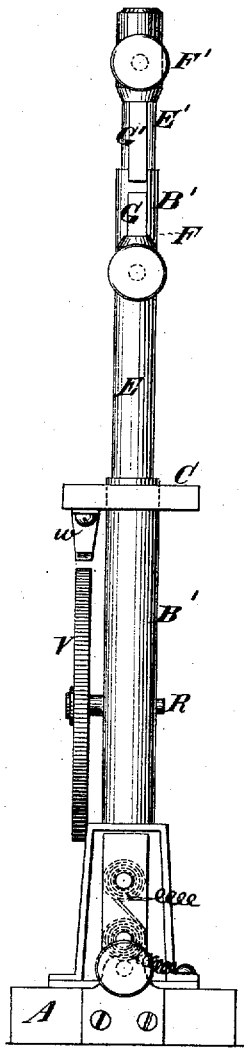
Figure 3:
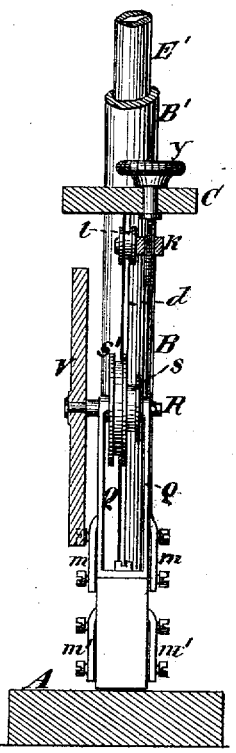
Figure 4:
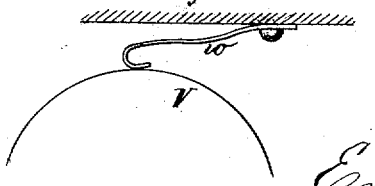

Figure 1 in the drawings is a side elevation of an electric lamp constructed in accordance with my invention. Fig. 2 is another elevation of the same, viewed at right angles from the direction in which the lamp is seen in Fig. 1. Fig. 3 is a sectionof the line *x x* in Fig. 1. Fig. 4 is a diagram illustrating a modification of one part of the machine.

A is a base or pedestal upon which all the parts of the lamp are supported, and to which they are attached.

B and B′ are hollow posts, connected at their upper ends by a cross-piece, C. In each of said posts, in the sides of the same which face each other, is a vertical slot, *d*, Fig. 3. In said hollow posts play vertically the bars E E′.

In the top of the bar E is a carbon-holder, F, and screw for holding one of the carbons, G. To an arm, H, extending from the bar E′, is attached an inverted socket or carbon-holder, F′, and a screw for holding the other carbon, G′.

Through the vertical slot *d* in the hollow post B extends from the bar E a pin, screw, or projection, *i′*, which slides vertically in the slot *d* when the said bar E moves up and down in said hollow post. Similarly from the bar E′ extends a pin, screw, or projection, *i*, through the vertical slot in the inner side of the hollow post B′, said projection sliding vertically in said slot as the bar E′ moves up or down in said hollow post.

Attached to and projecting from the hollow post B′ toward the hollow post B are arms or brackets *k k′*, containing bearings for the grooved sheaves *l l′ l²*.

To the lower part of the pillar B′ are pivoted, at one end, bars *m m′*, preferably of brass. To the other ends of said bars *m m′* is pivoted the armature N of the electro-magnet P P, the coils of which form part of the circuit through which the electric current reaches the carbons. Said bars *m m′* are so pivoted to said post B′ and armature N that when said armature is caused to approach the poles of the magnet by the attraction of the latter it is at the same time caused to move upward, and when it recedes from the poles of the magnet it moves downward. The receding and downward movements are assisted by an armature-spring, O, applied to the bar *m*.

To the magnet P P is attached an adjusting-screw, P′, which works in a fixed bearing in or on the base or pedestal A, and by which the relation of distance between the said magnet and the armature N may be adjusted for different strengths of current, in order that the weight of the said armature, or the weight of the said armature and the strength of the spring O, acting together, may be nicely balanced or adjusted to the strength of the current to produce the effect herein described.

It will be seen that the peculiar combination of the armature with the bars *m m′* prevents the ordinary attachment of an adjusting-screw to the armature for the purpose of regulating the distance of the armature from the magnet; and to secure such adjustability I attach such screw to the magnet itself instead of the armature.

From the upper part of the armature N rises a support, Q, which has formed therein bearings for the shaft R. Upon the shaft R are attached pulleys *s* and *s′*, which turn with said shaft. Attached to the pulley *s*, which has half the diameter of the pulley *s′*, is a cord or chain, T, which winds up said pulley, then passes over the sheave *l′*, and, passing downward, is attached to the projection *i′* on the bar E. Attached to the pulley *s′* is a cord or chain, T′, which passes under the sheave *l²*, then over the sheave *l*, then downward to the projection *i* on the bar E′. To the shaft R is also attached a wheel, V, which may have a perimeter milled or toothed to engage the head of a retaining spring or stop, *w*, attached to the under side of the cross-piece C. This stop is represented in Figs. 1 and 2 as consisting of a spring with a pawl-like head, but it may be constructed like a friction-brake, as shown in Fig. 4, in which case the periphery of the wheel V is not milled, toothed, or notched, but is preferably left smooth.

The bracket, arm, or support *k*, is fitted to slide on the post B′, and is provided with an adjusting-screw, Y, having a fixed bearing in the cross-piece C, by which arrangement the light may be adjusted in proper relation with the focus of the lens or reflector, the two carbon-holders being both raised equally by adjusting the bracket or support *k* upward, and lowered equally by adjusting the said bracket or support downward.

The operation of the lamp is as follows: The wheel V is first turned in the direction opposite to that indicated by the arrow in the drawings, which causes the carbon socket or holder F′ to move upward and the socket or holder F to move downward. When the said carbon-holders F F′ are thus separated the carbons are placed in the holders and secured by the screws in the usual manner. The wheel V being then allowed to turn freely, the bar E′ (which, being longer, is heavier than the bar E) moves down by its own gravity, and, turning the wheel V by the cord or chain T′ and the pulley *s*′, winds the cord T on the pulley *s*, and raises at the same time the carbon-holder F till the carbons meet. The electric current is then connected with the lamp, whereupon the magnet P P attracts the armature N, which, by the radial movement of the arms *m m*′, is caused to move upward, carrying with it the wheel V. The upward movement of the wheel V brings its upper edge into engagement with the spring *w*, which prevents said wheel and the pulleys *s s*′ from turning. By the said movement of the wheel V the distance from the shaft R to the pulley *l*′ is shortened, which permits the bar E and the carbon G to descend a little, separating the carbons sufficiently to produce an intense light. As the carbons get shorter their distance asunder increases, the resistance to the passage of the current increases, the power of the magnet P P is lessened, and the weight of the armature, with such assistance as may be given to it by the power of the spring O, becomes superior to that of the magnet. The armature N is then pulled away from the magnet, and, descending, carries the wheel V downward with it, freeing said wheel from the retaining-spring *w*. When this takes place the bar E′ falls a little and the bar E rises a little, bringing the carbons nearer together again. By this means the lamp becomes self-adjusting and self-feeding, the armature falling away whenever the resistance to the current becomes too great, and the magnet P P attracting the armature whenever the current passes with sufficient freedom through the circuit; and at the same time the said spring draws away the said armature the carbons are caused to approach each other sufficiently to compensate for their consumption, the feeding of the carbons as they are consumed, as well as their adjustment at the proper distance apart, being effected by the one electro-magnet, and clock-work or springs for effecting the feeding being dispensed with. This double result is obtained by attaching the pulleys *s s*′ and wheel V to the armature of the magnet, so that they move bodily therewith.

The lamp, as described, is intended for use in connection with a lens or reflector which requires the light to be maintained at a prescribed altitude, and as the carbon on the positive pole burns away about twice as fast as the other, it requires to be moved twice as much as the negative carbon. This is accomplished by making the diameter of the pulley *s*′ twice the diameter of the pulley *s*, which, the upper carbon, G′, being positive, gives its holder F′ twice as much movement as that given to the negative carbon-holder F. But when the precise altitude of the light is a matter of no importance, said light not being required to be adjusted in relation with a focus of a lens or of a reflector, I may use instead of the sliding bar E′ an immovable upright bar, and actuate the wheel V and pulley *s* by means of a spring around the shaft R to raise the sliding bar E and to compensate for the combustion of the carbons. In such case the pulleys and cord or chain for transmitting motion to the said shaft R from the bar E will be unnecessary.

I do not claim, broadly, the gearing of the carbon-holder of an electric lamp with the armature of an electro-magnet for the purpose of rendering it self-adjusting; but

What I claim as my invention is—

1. In an electric lamp, the combination of an electro-magnet, an armature, a carbon-holder, a brake-wheel, mechanism connecting said wheel with the carbon-holder, so that the carbon-holder cannot slide forward without imparting to said wheel a turning motion, a brake applied to said wheel, said wheel and mechanism being connected with the armature of the electro-magnet, so that when the armature is lifted, the carbon-holder, the connecting mechanism, and the wheel are lifted also and the latter pushed against the spring-brake, which then prevents it from turning, substantially as herein described.

2. In an electric lamp, the combination of an electro-magnet, an armature, parallel bars pivoted to said armature, so that the armature is one side of a parallelogram formed by the said armature, the parallel bars, and the line between the supporting-points of said parallel bars, whereby, when the said armature is pulled by said magnet, it is also pushed in vertical direction to the pull of the magnet, and keeping all the time a parallel position, substantially as herein described.

3. In an electric lamp, the combination of an electro-magnet, P P, armature N, parallel bars *m m*′, pivoted to the said armature, and the pulley-support Q, attached to the said armature, whereby, when the said armature is pulled laterally by the said magnet, the said armature and pulley-support are also lifted by the said magnet, substantially as and for the purpose described.

4. The combination, with the magnet P P, the armature N, and the bars *m m'*, constructed and operating substantially as described, of the adjusting-screw P', attached to the said magnet, substantially as and for the purpose described.

5. The combination, in an electric lamp, of a movable carbon-holder, an electro-magnet, an armature to said magnet, a pulley and a wheel arranged on the same axis and attached to and moving with said armature, a cord connecting said pulley with the movable carbon-holder, and a stop having a fixed attachment and arranged to operate on said wheel, all substantially as and for the purpose herein described.

6. The combination, with the carbon-holders, cords T T', connecting the same, pulleys *l l'*, over which said cords pass, of an adjustable support for the said pulleys, whereby the carbons may be adjusted higher or lower without changing their relative distance from each other, substantially as herein described.

7. The combination, with the vertically-moving bars E E', carrying carbon-holders, of a magnet, P P, an armature, N, bars *m m'*, pivoted at one end to said armature and at the other end to a suitable support, the wheel V and pulleys *s s'*, connected with the armature by a support, Q, cords or chains T T', and sheaves *t t' t²*, and the stop *w*, all constructed and operating substantially as and for the purpose specified.

EMIL BÜRGIN.

Witnesses:
HENRY T. BROWN,
FREDK. HAYNES.